(12) United States Patent
Wang et al.

(10) Patent No.: US 10,937,143 B1
(45) Date of Patent: Mar. 2, 2021

(54) FRACTURE DETECTION METHOD, ELECTRONIC DEVICE AND STORAGE MEDIUM

(71) Applicant: Ping An Technology (Shenzhen) Co., Ltd., Shenzhen (CN)

(72) Inventors: Yirui Wang, Rockville, MD (US); Le Lu, Poolesville, MD (US); Dakai Jin, Laurel, MD (US); Adam Patrick Harrison, Silver Spring, MD (US); Shun Miao, Bethesda, MD (US)

(73) Assignee: Ping An Technology (Shenzhen) Co., Ltd., Shenzhen (CN)

(*) Notice: Subject to any disclaimer, the term of this patent is extended or adjusted under 35 U.S.C. 154(b) by 93 days.

(21) Appl. No.: 16/546,624

(22) Filed: Aug. 21, 2019

(51) Int. Cl.
| | | |
|---|---|---|
| *G06T 7/00* | (2017.01) | |
| *G06K 9/62* | (2006.01) | |
| *G06N 20/00* | (2019.01) | |
| *G06N 3/08* | (2006.01) | |

(52) U.S. Cl.
CPC .......... *G06T 7/0002* (2013.01); *G06K 9/6256* (2013.01); *G06K 9/6277* (2013.01); *G06N 3/084* (2013.01); *G06N 20/00* (2019.01); *G06T 2207/20081* (2013.01); *G06T 2207/20084* (2013.01)

(58) Field of Classification Search
CPC ......... G06T 7/0002; G06T 2207/20081; G06T 2207/20084; G06N 20/00; G06N 3/084; G06K 9/6256; G06K 9/6277

USPC .......................................................... 382/100
See application file for complete search history.

(56) References Cited

U.S. PATENT DOCUMENTS

| | | | |
|---|---|---|---|
| 2019/0361439 A1* | 11/2019 | Zeng | G06K 9/00791 |
| 2020/0126234 A1* | 4/2020 | Yokota | G06T 7/174 |
| 2020/0349439 A1* | 11/2020 | Luo | G06N 3/0472 |
| 2020/0356842 A1* | 11/2020 | Guo | G06K 9/00671 |

FOREIGN PATENT DOCUMENTS

| | | | | |
|---|---|---|---|---|
| WO | WO2019108251 | * | 6/2019 | G06T 7/20 |

* cited by examiner

*Primary Examiner* — Jerome Grant, II
(74) *Attorney, Agent, or Firm* — ScienBiziP, P.C.

(57) ABSTRACT

A fracture detection method executed by an electronic device is provided. The fracture detection method includes obtaining a to-be-detected image; using a Fully Convolutional Networks (FCN) model to process the to-be-detected image to obtain a fracture probability map of the to-be-detected image; performing a maximum pooling process on the fracture probability map to obtain a first fracture probability; extracting Regions of Interests (ROIs) of the to-be-detected image based on the FCN model; inputting the ROIs into a classification model to obtain a second fracture probability; calculating a product of the first fracture probability and the second fracture probability as a probability of a fracture phenomenon in the to-be-detected image. The present disclosure combines the FCN model and the ROIs to realize an automatic fracture detection, and the accuracy is higher. A device employing the method is also disclosed.

20 Claims, 4 Drawing Sheets

FRACTURE DETECTION METHOD, ELECTRONIC DEVICE AND STORAGE MEDIUM

FIELD

The present disclosure relates to image processing in the medical field, and in one embodiment to a fracture detection method an electronic device and a storage medium.

BACKGROUND

Hip and pelvic fractures are serious injuries with life-threatening complications, and hip and pelvic fractures belong to a frequent trauma injury category world-wide. X-rays are standard imaging tools for diagnosing fractures in an emergency room (ER). However, as anatomical complexities and projection distortions are also involved, diagnostic errors of fractures based on the X-rays are very common, and a rate of diagnostic errors is higher, which may delay treatment and increase patient care cost, morbidity, and mortality. As such, computer aid for effective X-rays is of high clinical interest, with the aim of reducing diagnostic errors and improving patient outcomes.

10003) Image-level labels are only supervisory signals typically available in picture archiving and communication system (PACS) data. A widely adopted formulation for X-rays abnormality detection is a single-stage global classifier. However, for the X-rays, the approach is challenged by localized nature of fractures and complexity of surrounding anatomical regions. Moreover, as a training dataset cannot capture combinatorial complexity of configurations of fracture locations, orientations, and background contexts within a whole X-ray, such global classifiers are prone to overfitting.

Another major challenge lies in a fact that fractures are localized patterns that require localized analysis. However, the X-rays residing in hospital picture archiving and communication system do not typically specify Region of Interests (ROIs).

BRIEF DESCRIPTION OF THE DRAWINGS

In order to describe the technical solutions in embodiments of the present disclosure more clearly, the following briefly introduces the accompanying drawings needed for describing the embodiments. The accompanying drawings in the following description show some embodiments of the present disclosure, and persons of ordinary skill in the art may still derive other drawings from these accompanying drawings without creative efforts.

DETAILED DESCRIPTION

In order to make objects, technical solutions and advantages of a present disclosure more comprehensible, the present disclosure is described in detail below with references to drawings and specific embodiments.

Figure 1:
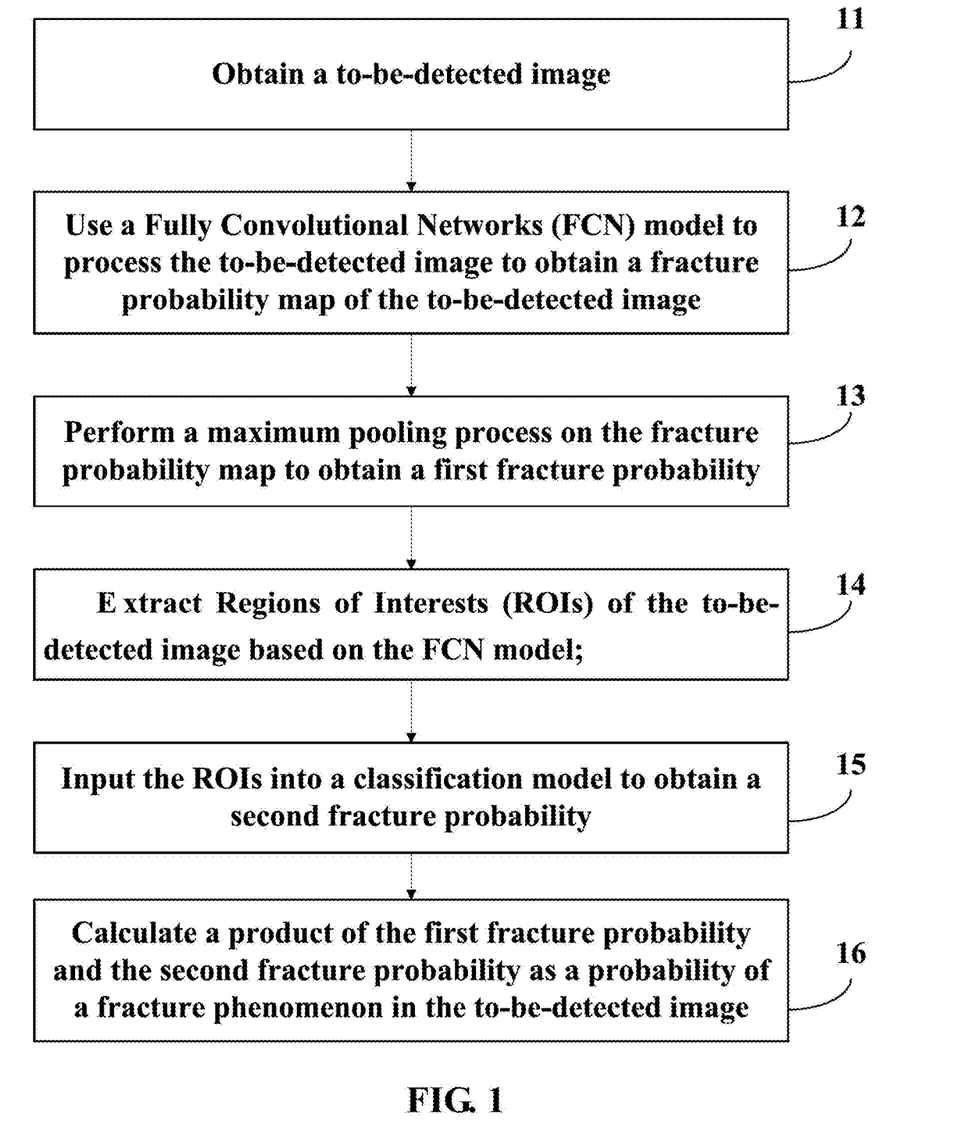
FIG. 1 is, a flowchart of an embodiment of a fracture detection method.

FIG. 1 is a flowchart of an embodiment of a fracture detection method. According to different requirements, an order of blocks in the flowchart can be changed, and some blocks can be deleted.

The fracture detection method can be applied to one or more electronic devices. An electronic device is capable of automatically performing numerical calculation and/or information processing according to an instruction configured or stored in advance, and hardware of the electronic device can include but is not limited to a microprocessor, an Application Specific Integrated Circuit (ASIC), a Field-Programmable Gate Array (FPGA), a Digital Signal Processor (DSP), and an embedded device, etc.

The electronic device can be any electronic product that can interact with users, such as a personal computer, a tablet computer, a smart phone, a Personal Digital Assistant (PDA), a game machine, an Interactive Network Television. (IPTV), and smart wearable devices, etc.

The electronic device, can also include a network device and/or a user device. The network device can include, but is not limited to, a single network server, a server group composed of a plurality of network servers, or a cloud computing system composed of a plurality of hosts or network servers.

The electronic device can be in a network. The network can include, but is not limited to, the Internet, a wide region network, a metropolitan region network, a local region network, a virtual private network (VPN), and the like.

A two-stage weakly supervised ROIs mining and subsequent classification method for X-rays fracture classification is provided.

In a first stage, training a weakly-supervised, but high capacity, Multiple Instance Learning (MIL) Fully Convolutional Network (FCN) to mine local probable positive and definite hard negative ROIs.

In a second stage, using mined ROIs to train a lower capacity network in a fully-supervised setting.

During inference, two networks are chained together to provide a complete classification solution.

The fracture detection method is explained below.

At block 11, an electronic device may obtain a to-be-detected image.

In one embodiment, the electronic device may obtain the to-be-detected image when receiving a fracture detection instruction. The fracture detection instruction can be triggered by a relevant user.

In one embodiment of the present disclosure, the to-be-detected image includes an X-ray.

In one embodiment, when the electronic device detects an X-ray being uploaded to a preset destination (e.g., a server, a website, the electronic device, etc.), the electronic device may determine that the fracture detection instruction is received.

In another embodiment, the electronic device may determine that the fracture detection instruction is received when the electronic device detects that a configuration button (such as a configuration virtual button or a configuration physical button, etc.) is triggered.

At block 12, the electronic device uses a Fully Convolutional Networks (FCN) model trained in advance to process the to-be-detected image to obtain a fracture probability map of the to-be-detected image.

In one embodiment of the present disclosure, the FCN model may be a convolutional neural network model.

In one embodiment, the electronic device may train the FCN model as follows.

The electronic device may obtain sample images with labels. The labels are used for determining a true fracture probability of each of the sample images. The electronic device may further use an FCN algorithm to obtain a probability map of each of the sample images. The electronic device may perform a Log of a Sum of Exponentials (LSE) pooling process on the probability map to obtain a third fracture probability of each of the sample images. The electronic device may determine the true fracture probability of the sample images according to the labels of the sample images. The electronic device may further use a Binary Cross Entropy (BCE) algorithm to process the third fracture probability and the true fracture probability to obtain a first, loss value. The electronic device may optimize parameters of the FCN model according to the first loss value.

The labels can be labeled manually or automatically by a machine.

In one embodiment, the electronic device may train the FCN model using a deep MIL formulation, employing a large-capacity DenseNet as backbone.

Owing to localized properties of the FCN model, each value of the probability map can be interpreted as a probability of fracture in a corresponding region in an input image. The electronic device may use the FCN algorithm to process the sample images to obtain the probability map of each of the sample images as follows:

The electronic device may use a 1×1 convolutional layer and a sigmoid activation to process DenseNet features to produce the probability map of each of the sample images.

The electronic device may further perform the LSE pooling process to obtain the predicted fracture probability of each of the sample images according to formula:

$$LSE(S) = \frac{1}{r} \cdot \log\left[\frac{1}{|S|} \cdot \sum_{(i,j) \in S} \exp(r \cdot p_{ij})\right]$$

Where $\{p_{ij}\}$ is a probability map, r is a hyper-parameter controlling a behavior of LSE between a max pooling ($r \to \infty$) and an average pooling ($r \to 0$), S is a domain of a sample images, and i and j are pixel coordinates of each pixel in the sample image.

The electronic device may further process the predicted fracture probability and the true fracture probability by using the BCE algorithm to obtain the first loss value. The electronic device further optimizes processing according to the first loss value to obtain the FCN model. That is to say, during the training process, the FCN model is continuously optimized by using the BCE as a loss function, thereby improving an accuracy of the FCN model.

In other embodiments, the electronic device can also adopt other loss functions, such as standard deviation, etc.

Instead of adopting a maximum value or an average value as the predicted fracture probability of the sample images, the present disclosure performs the LSE pooling on the probability map to integrate a model output into a probability, thus determining whether fractures exist in the sample images.

At block 13, the electronic device may perform a maximum pooling process on the fracture probability map to obtain a first fracture probability.

In one embodiment of the present disclosure, by performing the maximum pooling process on the fracture probability map, a probability value can be obtained, and the electronic device determines the probability value as the first fracture probability.

The first fracture probability is a result of a first phase of the present disclosure using the FCN model for prediction.

At block 14, the electronic device may extract Regions of Interests (ROIs) of the to-be-detected image based on the FCN model.

In one embodiment of the present disclosure, as the fracture detection is challenged by localized nature of fractures and complexity of surrounding anatomical regions, the fracture detection need to use localized patterns that require localized analyses. Thus the electronic device extracts the ROIs of the to-be-detected image based on the FCN model.

In one embodiment, the electronic device extracting the ROIs of the to-be-detected image based on the FCN model includes that:

The electronic device may obtain regions which have a probability greater than or equal to a preset threshold from the fracture probability map of the to-be-detected image, and the electronic device may determine a first quantity of obtained regions. The electronic device may determine a second quantity of the ROIs to be extracted. The electronic device may further compare the first quantity with the second quantity.

When the first quantity is greater than the second quantity, the electronic device may randomly extract the second quantity of regions from the obtained regions as the ROTS of the to-be-detected image.

When the first quantity is equal to the second quantity, the electronic device may determine the obtained regions as the ROIs of the to-be-detected image.

When the first quantity is less than the second quantity, the electronic device may calculate a difference between the second quantity and the first quantity as a third quantity. The electronic device may randomly obtain the third quantity of regions from the to-be-detected image. The electronic device may determine all the regions obtained twice as the ROIs of the to-be-detected image.

The preset threshold and the second quantity can be configured by derived experience.

At block 15, the electronic device may input the ROIs into a classification model to obtain a second fracture probability.

The second fracture probability can be a result of a second phase of the present disclosure using the classification model for prediction.

In one embodiment of the present disclosure, before inputting extracted ROIs into a pre-trained classification model, the electronic device may train the classification model.

In one embodiment, the electronic device training the classification model includes that:

The electronic device may determine fracture samples and non-fracture samples according to the labels of the sample images. Based on the probability map, the electronic device may extract ROIs of the fracture samples as positive samples, and extract ROIs of the non-fracture samples as negative samples. The electronic device may further use a residual network to train a classification model based on the positive samples and the negative samples. The electronic device may obtain output data of the classification model, and then process the output data by using the BCE algorithm to obtain a second loss value. The electronic device may optimize parameters of the classification model using a back propagation algorithm according to the second loss value.

In other embodiments, the electronic device can also adopt other loss functions, such as standard deviation, etc., and the present disclosure is not to be limiting.

The electronic device extracting the ROIs of the fracture samples as the positive sample includes that:

The electronic device may determine a probability map corresponding to each image of the fracture samples to be a first probability map. The electronic device may obtain obtaining regions of the each image according to the first probability map, wherein a fracture probability of each of the regions is greater than or equal to a preset threshold. The electronic device may extract a first number of regions from the regions of each of the fracture samples as the ROIs, the first number is an integer greater than 0. The electronic device may determine the positive sample based on the ROIs of the each image.

The positive sample refers to a sample that can have a fracture.

The preset threshold can be customized according, to different requirements. For example, in order to increase the sensitivity of the classification model, the electronic device may configure the preset threshold to be 99% so that the electronic device can excavate all the fracture-like regions and use them for training the classification model.

The value of the first number is also not limited, for example, the first number can be 5.

The electronic device further extracting the ROIs of the non-fracture samples as the negative sample includes that:

The electronic device may determine a probability map corresponding to each image of the non-fracture samples to be a second probability map. The electronic device may obtain regions of the each image according to the second probability map, wherein a fracture probability of each of the regions is greater than or equal to the preset threshold. The electronic device may determine a second number of the regions. The electronic device may compare the second number and the first number to get a comparison result. The electronic device may determine ROIs of the each image according to the comparison result. The electronic device may determine the negative sample based on the ROIs of the each image.

The negative sample refers to a sample that may not have a fracture.

The electronic device determining the ROIs of the each image according to the comparison result includes that:

(1) When the second number is greater than or equal to the first number, the electronic device may extract first number regions randomly from the obtained regions as the ROIs of the each image.

(2) When the second number is smaller than the first number, the electronic device may record the obtained regions as first ROIs. The electronic device may extract a third number regions randomly from the each image as second ROIs. The electronic device may determine the first ROIs and the second ROIs as the ROIs of the each image. The third number is difference between the first number and the second number.

It can be understood that when a non-fracture is labeled, the probability of detecting a fracture is very small. Therefore, it is likely that the second number is less than the first number. At this time, the electronic device may randomly extract additional ROIs until the total number of the ROIs of the each image is the first number.

Since the first ROIs are extracted in a sample that is predetermined to be a non-fracture, the prediction is more complex, the first ROIs belongs to a complex negative sample. The second ROIs are randomly extracted additional ROIs. Therefore the second ROIs belongs to a simple negative sample.

Through above embodiment, although a certain degree of tag noise is added due to factors such as label errors, the classification model is trained by the ROIs. Since the positive samples are mostly ROIs around fractures with limited background context, background environment is effectively eliminated, and visual patterns of fractures become more dominant, simplifying the classification task. In addition, distribution of mined ROIs are heavily weighted toward hard negatives. This concentrates the modeling power of the second-stage classifier on differentiating these difficult confusing fracture-like patterns. With extracted ROIs as a training sample, a smaller capacity network can be trained to reliably classify the ROIs, which is more general application and less prone to overfitting compared to a high-capacity network modeling entire X-rays. Thus the embodiment is more local and versatile.

At block 16, the electronic device may calculate a product of the first fracture probability and the second fracture probability as a probability of a fracture phenomenon in the to-be-detected image.

Instead of using the single model output as a result of prediction, the present disclosure combines a prediction result of the FCN model and a prediction result of the classification model. The present disclosure effectively reduces influence of a false report of the FCN model on the prediction result. Furthermore, an accuracy of prediction as to whether there is a fracture phenomenon in the to-be-detected image is improved.

The fracture detection method can detect whether there is the fracture phenomenon, as a memory ability of the model, there is an algorithmic rejection, a specific type of the fracture cannot be distinguished, However, for automatic medical image reporting and the like where it is necessary to distinguish a type of fractures, the electronic device can add an additional classification output node to the classification model.

In one embodiment, the labels can be further used to determine a fracture type of the sample images, the method further includes that:

The electronic device may determine a fracture type of the positive sample based on the labels. The electronic device may add a fracture classification node to the classification model based on the positive sample and the fracture type of the positive sample. The electronic device may calculate a training loss of the classification model after adding the node. The electronic device may further optimize the classification model after adding the node based on the training loss.

Through the above embodiment, not only the probability of occurrence of a fracture phenomenon in the to-be-detected image can be outputted, but also the type of fractures can be outputted to achieve a better auxiliary medical effect.

In one embodiment of the present disclosure, in order to test prediction effect of the fracture detection method, the electronic device may evaluates the fracture detection method using X-ray images collected from an anonymized Picture Archiving and Communication Systems (PACS) corresponding to patients in a trauma registry. The electronic device resizes all images to 961*961 pixels. A final dataset is including of 4410 images, which include 2776 images with fractures (1975 hip fractures and 801 pelvic fractures, respectively). In addition to the dataset, the electronic device also collects an independent X-ray dataset, containing 150 cases (50 hip fractures, 50 pelvic fractures, and 50 no findings) for a reader study comparing the approach of the present disclosure with that of 23 physicians.

Test results show that the present disclosure has higher recall rate, specificity, and accuracy compared to the previous intelligent prediction method (single-stage high-capacity method, single-stage low-capacity method, etc.).

In addition, the present disclosure outperforms Emergency Room (ER) physicians and surgeons, while not performing as well as orthopedic specialists and radiologists. It is worth noting that when trauma patients are sent to the ER, it is commonly the case that only the ER physicians or the surgeons are available to make immediate diagnostic and treatment decisions. As such, the approach of the present disclosure can be an effective aid in a high-stress ER environment.

It can be seen from the above technical solution that, in the present disclosure, when receiving the fracture detection instruction, obtaining the to-be-detected image, processing the to-be-detected image by using the pre-trained FCN model to obtain the fracture probability map of the to-be-detected image, performing the maximum pooling process on the fracture probability map to obtain the first fracture probability, extracting the ROIs of the to-be-detected image based on the FCN model, inputting extracted ROIs into the pre-trained classification model to obtain the second fracture probability, calculating the product of the first fracture probability and the second fracture probability to obtain the probability of the fracture phenomenon in the to-be-detected image. The present disclosure combines the FCN model and the ROIs to realize an automatic detection of the fracture, and the accuracy is higher.

Although there are automatic methods for detecting fractures, the methods are usually only for hip fractures, and such methods do not attempt to classify more complex pelvic fractures (such as fractures in three pelvic bones, an ilium, an ischium, and a pubis).

Figure 2:
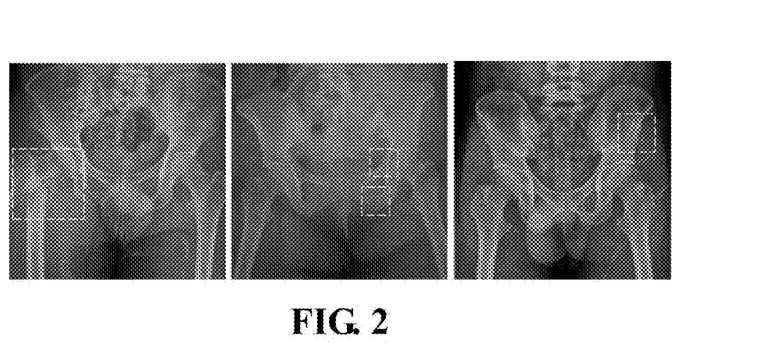
FIG. 2 shows a pelvic fracture.

FIG. 2 shows a pelvic fracture. As there are a large number of possible types with very different visual patterns at various locations, makeup of pelvis fractures is much more complex. In addition, pelvic bones overlap with a lower abdomen, further confounding image patterns. Finally, unlike hip fractures, which occur at a femoral neck/head, pelvic fractures can occur anywhere on a large pelvis, this increases aforementioned image pattern combinatorial complexity and also precludes automatic ROIs extraction based on anatomy alone. Thus, although using ROI-based classification is even more desirable for the pelvic fractures, it is paradoxically more challenging to extract the ROIs.

Figure 3:
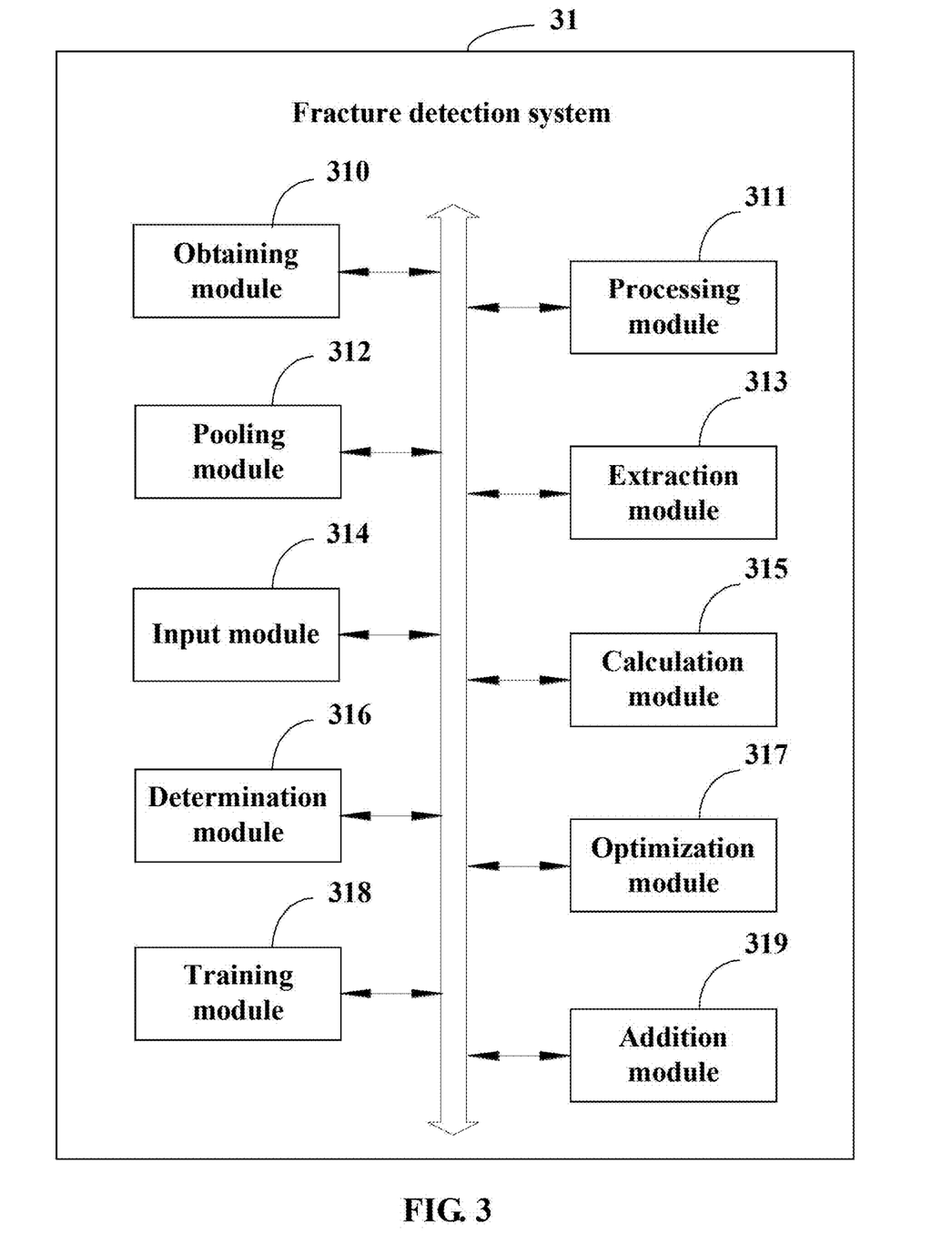
FIG. 3 is a block diagram of an embodiment of function modules of a fracture detection system.

FIG. 3 is a block diagram of an embodiment of function modules of a fracture detection system. The fracture detection system 31 includes an obtaining module 310, a processing module 311, a pooling module 312, an extraction module 313, an input module 314, a calculation module 315, a determination module 316, an optimization module 317, a training module 318, and an addition module 319. The plurality of modules can comprise computerized instructions in a form of one or more computer-readable programs that can be stored in a non-transitory computer-readable medium (e.g., a storage device of the computer device), and executed by at least one processor of the electronic device to implement fracture detection function (described in detail in FIG. 1).

The obtaining module 310 may obtain a to-be-detected image.

In one embodiment of the present disclosure, the obtaining module 310 may obtain the to-be-detected image when receiving a fracture detection instruction. The fracture detection instruction can be triggered by a relevant user.

In one embodiment of the present disclosure, the to-be-detected image includes an X-ray.

In one embodiment, when the obtaining module 310 detects an uploaded X-ray, it is determined that the fracture detection instruction is received.

In one embodiment, when detecting that an X-ray is being uploaded to a preset destination (e.g., a server, a website, the electronic device, etc.), the obtaining module 310 may determine that the fracture detection instruction is received.

In another embodiment, the obtaining module 310 may determine that the fracture detection instruction is received when the obtaining module 310 detects that a configuration button (such as a configuration virtual button or a configuration physical button, etc.) is triggered.

The processing module 311 may use a Fully Convolutional Networks (FCN) model trained in advance to process the to-be-detected image to obtain a fracture probability map of the to-be-detected image.

In one embodiment of the present disclosure, the FCN model may be a convolutional neural network model.

In one embodiment, training the FCN model is done as follows.

The obtaining module 310 may obtain sample images with labels. The labels are used for determining a true fracture probability of each of the sample images. The processing, module 311 may further use an FCN algorithm to obtain a probability map of each of the sample images. The pooling module 312 may perform a Log of a Sum of Exponentials (LSE) pooling process on the probability map to obtain a third fracture probability of each of the sample images. The determination module 316 may determine the true fracture probability of the sample images according to the labels of the sample images. The processing module 311 may further use a Binary Cross Entropy (BCE) algorithm to process the third fracture probability and the true fracture probability to obtain a first loss value. The optimization module 317 may optimize parameters of the FCN model according to the first loss value.

The labels can be labeled manually or automatically by a machine, and the present disclosure does not limit.

In one embodiment, the electronic device may train the FCN model using a deep MIL formulation, employing a large-capacity DenseNet as backbone.

Owing to localized properties of the FCN model, each value of the probability map can be interpreted as a probability of fracture in a corresponding region in an input image. The processing module 311 may use the FCN algorithm to process the sample images to obtain the probability map of each of the sample images as follows:

The processing module 311 processes may use a 1×1 convolutional layer and a sigmoid activation to process DenseNet features to produce the probability map of each of the sample images.

The pooling module 312 may further perform the LSE pooling process to obtain the predicted fracture probability of each of the sample images according to formula:

$$LSE(S) = \frac{1}{r} \cdot \log\left[\frac{1}{|S|} \cdot \sum_{(i,j) \in S} \exp(r \cdot p_{ij})\right]$$

Where $\{p_{ij}\}$ is a probability map, r is a hyper-parameter controlling a behavior of LSE between a max pooling (r→∞)

and an average pooling (r→0), S is a domain of a sample images, and i and j are pixel coordinates of each pixel in the sample image.

The processing module 311 may further process the predicted fracture probability and the true fracture probability by using the BCE algorithm to obtain the first loss value. The optimization module 317 further optimizes processing according to the first loss value to obtain the FCN model. That is to say, during the training process, the FCN model is continuously optimized by using the BCE as a loss function, thereby improving an accuracy of the FCN model.

In other embodiments, the optimization module 317 can also adopt other loss functions, such as standard deviation, etc.

Instead of adopting a maximum value or an average value as the predicted fracture probability of the sample images, the present disclosure performs the LSE pooling on the probability map to integrate a model output into a probability, thus determining whether fractures exist in the sample images.

The processing module 311 may perform a maximum pooling process on the fracture probability map to obtain a first fracture probability.

In one embodiment of the present disclosure, by performing the maximum pooling process on the fracture probability map, a probability value can be obtained, and the processing module 311 determines the probability value as the first fracture probability.

The first fracture probability is a result of a first phase of the present disclosure using the FCN model for prediction.

The extraction module 313 may extract Regions of Interests (ROIs) of the to-be-detected image based on the FCN model.

In one embodiment of the present disclosure, as the fracture detection is challenged by localized nature of fractures and complexity of surrounding anatomical regions, the fracture detection need to use localized patterns that require localized analyses. Thus the extraction module 313 extracts the ROIs of the to-be-detected image based on the FCN model.

In one embodiment, the extraction module 313 extracting the ROIs of the to-be-detected image based on the FCN model includes that:

The extraction module 313 may obtain regions which have a probability greater than or equal to a preset threshold from the fracture probability map of the to-be-detected image, and the extraction module 313 may determine a first quantity of obtained regions. The extraction module 313 may determine a second quantity of the ROIs to be extracted. The extraction module 313 may further compare the first quantity with the second quantity.

When the first quantity is greater than the second quantity, the extraction module 313 may randomly extract the second quantity of regions from the obtained regions as the ROIs of the to-be-detected image.

When the first quantity is equal to the second quantity, the extraction module 313 may determine the obtained regions as the ROIs of the to-be-detected image.

When the first quantity is less than the second quantity, the extraction module 313 may calculate a difference between the second quantity and the first quantity as a third quantity. The extraction module 313 may randomly obtain the third quantity of regions from the to-be-detected image. The extraction module 313 may determine all the regions obtained twice as the ROIs of the to-be-detected image.

The preset threshold and the second quantity can be configured by derived experience.

The input module 314 may input the ROIs into a classification model to obtain a second fracture probability.

The second fracture probability can be a result of a second phase of the present disclosure using the classification model for prediction.

In one embodiment of the present disclosure, before inputting extracted ROIs into a pre-trained classification model, the electronic device may train the classification model.

In one embodiment, training the classification model includes that:

The determination module 316 may determine fracture samples and non-fracture samples according to the labels of the sample images. Based on the probability map, the extraction module 313 may extract ROIs of the fracture samples as a positive sample, and extract ROIs of the non-fracture samples as negative samples. The training module 318 may further use a residual network to train a classification model based on the positive samples and the negative samples. The obtaining module 310 may obtain output data of the classification model, and then the processing module 311 may process the output data by using the BCE algorithm to obtain a second loss value. The optimization module 317 may optimize parameters of the classification model using a back propagation algorithm according to the second loss value.

In other embodiments, the optimization module 317 can also adopt other loss functions, such as standard deviation, etc., and the present disclosure is not to be limiting.

The extraction module 313 extracting the ROIs of the fracture samples as the positive sample includes that:

The extraction module 313 may determine a probability map corresponding to each image of the fracture samples, to be a first probability map. The extraction module 313 may obtain obtaining regions of the each image according to the first probability map, wherein a fracture probability of each of the regions is greater than or equal to a preset threshold. The extraction module 313 may extract a first number of regions from the regions of each of the fracture samples as the ROIs, the first number is an integer greater than 0. The extraction module 313 may determine the positive sample based on the ROIs of the each image.

The positive sample refers to a sample that can have a fracture.

The preset threshold can be customized according to different requirements. For example, in order to increase the sensitivity of the classification model, the extraction module 313 may configure the preset threshold to be 99%, so that the extraction module 313 can excavate all the fracture-like regions and use them for training the classification model.

The value of the first number is also not limited, for example, the first number can be 5.

The extraction module 313 further extracting the ROIs of the non-fracture samples as the negative sample includes that:

The extraction module 313 may determine a probability map corresponding to each image of the non-fracture samples to be a second probability map. The extraction module 313 may obtain regions of the each image according to the second probability map, wherein a fracture probability of each of the regions is greater than or equal to the preset threshold. The extraction module 313 may determine a second number of the regions. The extraction module 313 may compare the second number and the first number to get a comparison result. The extraction module 313 may determine ROIs of the each image according to the comparison result. The extraction module 313 may determine the negative sample based on the ROIs of the each image.

The negative sample refers to a sample that may not have a fracture.

The extraction module 313 determining the ROIs of the each image according to the comparison result includes that:

(1) When the second number is greater than or equal to the first number, the extraction module 313 may extract first number regions randomly from the obtained regions as the ROIs of the each image.

(2) When the second number is smaller than the first number, the extraction module 313 may record the obtained regions as first ROIs. The extraction module 313 may extract a third number regions randomly from the each image as second ROIs. The extraction module 313 may determine the first ROIs and the second ROIs as the ROIs of the each image. The third number is difference between the first number and the second number.

It can be understood that when a non-fracture is labeled, the probability of detecting a fracture is very small. Therefore, it is likely that the second number is less than the first number. At this time, the extraction module 313 may randomly extract additional ROIs until the total number of the ROIs of the each image is the first number.

Since the first ROIs are extracted in a sample that is predetermined to be a non-fracture, the prediction is more complex, the first ROIs belongs to a complex negative sample. The second ROIs are randomly extracted additional ROIs. Therefore the second ROIs belongs to a simple negative sample.

Through above embodiment, although a certain degree of tag noise is added due to factors such as label errors, the classification model is trained by the ROIs. Since the positive samples are mostly ROIs around fractures with limited background context, background environment is effectively eliminated, and visual patterns of fractures become more dominant, simplifying the classification task. In addition, distribution of mined ROIs are heavily weighted toward hard negatives. This concentrates the modeling power of the second-stage classifier on differentiating these difficult/confusing fracture-like patterns. With extracted ROIs as a training sample, a smaller capacity network can be trained to reliably classify the ROIs, which is more general application and less prone to overfitting compared to a high-capacity network modeling entire X-rays. Thus the embodiment is more local and versatile.

The calculation module 315 may calculate a product of the first fracture probability and the second fracture probability as a probability of a fracture phenomenon in the to-be-detected image.

Instead of using the single model output as a result of prediction, the present disclosure combines a prediction result of the FCN model and a prediction result of the classification model. The present disclosure effectively reduces influence of a false report of the FCN model on the prediction result. Furthermore, an accuracy of prediction as to whether there is a fracture phenomenon in the to-be-detected image is improved.

The fracture detection, system can detect whether there is the fracture phenomenon, as a memory ability of the model, there is an algorithmic rejection, a specific type of the fracture cannot be distinguished.

However, for automatic medical image reporting and the like where it is necessary to distinguish a type of fractures, the addition module 319 can add an additional classification output node to the classification model.

In one embodiment, the labels can be further used to determine a fracture type of the sample images, the method further includes that:

The determination module 316 may determine a fracture type of the positive sample based on the labels. The addition module 319 may acid a fracture classification node to the classification model based on the positive sample and the fracture type of the positive sample. The calculation module 315 may calculate a training loss of the classification model after adding the node. The optimization module 317 may further optimize the classification model after adding the node based on the training loss.

Through the above embodiment, not only the probability of occurrence of a fracture phenomenon in the to-be-detected image can be outputted, but also the type of fractures can be outputted to achieve a better auxiliary medical effect.

In one embodiment of the present disclosure, in order to test prediction effect of the fracture detection system, the electronic device may evaluate the fracture detection system using X-ray images collected, from an anonymized Picture Archiving and Communication Systems (PACS) corresponding to patients in a trauma registry. The electronic device resizes all images to 961*961 pixels. A final dataset is including of 4410 images, which include 2776 images with fractures (1975 hip fractures and 801 pelvic fractures, respectively). In addition to the dataset, the electronic device also collects an independent X-ray dataset, containing 150 cases (50 hip fractures, 50 pelvic fractures, and 50 no findings) for a reader study comparing the approach of the present disclosure with that of 23 physicians.

Test results show that the present disclosure has higher recall rate, specificity and accuracy compared to the previous intelligent prediction method (single-stage high-capacity method, single-stage low-capacity method, etc.).

In addition, the present disclosure outperforms Emergency Room (ER) physicians and surgeons, while not performing as well as orthopedic specialists and radiologists. It is worth noting that when trauma patients are sent to the ER, it is commonly the case that only the ER physicians or the surgeons are available to make immediate diagnostic and treatment decisions. As such, the approach of the present disclosure can be an effective aid in a high-stress ER environment.

It can be seen from the above technical solution that, in the present disclosure, when receiving the fracture detection instruction, obtaining the to-be-detected image, processing the to-be-detected image by using the pre-trained FCN model to obtain the fracture probability map of the to-be-detected image, performing the maximum pooling process on the fracture probability map to obtain the first fracture probability, extracting the Wills of the to-be-detected image based on the FCN model, inputting extracted ROIs into the pre-trained classification model to obtain the second fracture probability, calculating the product of the first fracture probability and the second fracture probability to obtain the probability of the fracture phenomenon in the to-be-detected image. The present disclosure combines the FCN model and the ROIs to realize an automatic detection of the fracture, and the accuracy is higher.

Figure 4:
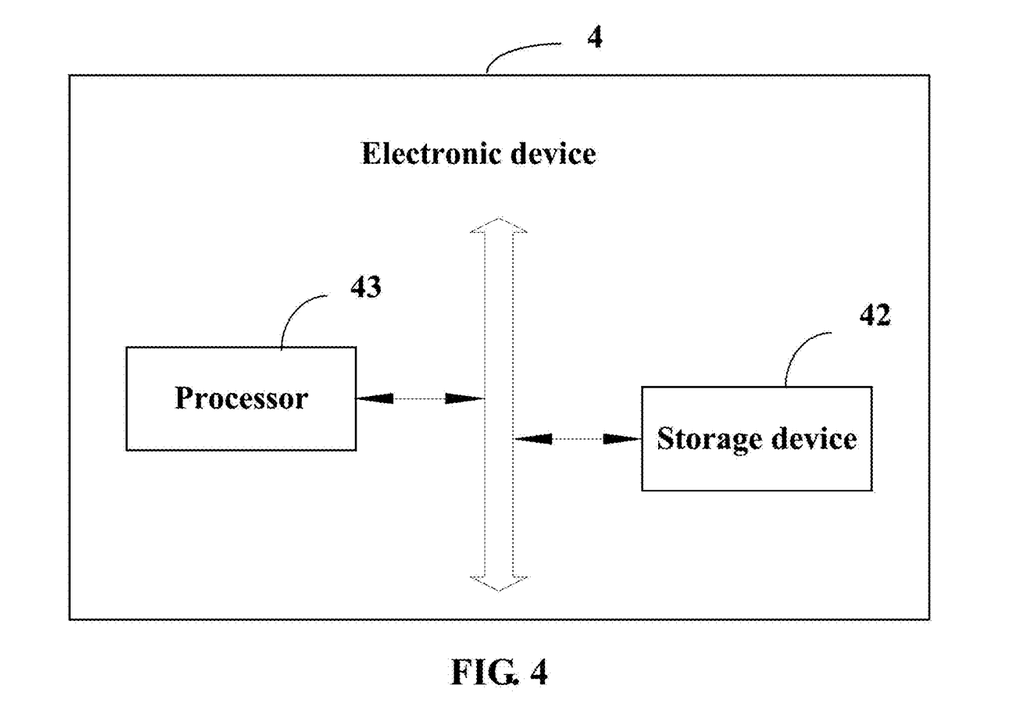
FIG. 4 is a block diagram of an electronic device executing a fracture detection method.

FIG. 4 is a block diagram of an electronic device executing a fracture detection method.

An electronic device 4 is a device capable of automatically performing numerical calculation and/or information processing according to an instruction configured or stored in advance, and hardware of the electronic device 4 can include but is not limited to a microprocessor, an Application Specific Integrated Circuit (ASIC), a Field-Programmable Gate Array (FPGA), a Digital Signal Processor (DSP), and an embedded device, etc.

The electronic device 4 further includes, but is not limited to, any electronic product that can interact with a user through a keyboard, a mouse, a remote controller, a touch panel, or a voice control device. For example, a personal computer, a tablet computer, a smart phone, a Personal Digital Assistant (PDA), a games console, an Internet Protocol Television (IPTV), a smart wearable devices, and the like.

The electronic device 4 can also be a computing device such as a desktop computer, a notebook, a palmtop computer, and a cloud server.

The network to which the electronic device 4 is connected includes, but is not limited to, the Internet, a wide area network, a metropolitan area network, a local area network, a virtual private network (VPN) and the like.

In one embodiment of the present disclosure, the electronic device 4 includes, but is not limited to, a storage device 42, a processor 43, and a computer program stored in the storage device 42 and operable on the processor 43. For example, a fracture detection procedure.

It will be understood by those skilled in an art that the electronic device 4 is only an example, no limitations are imposed on the electronic device 4, other examples can include more or less components than those illustrated, or combine some components, or have different components. The electronic device 4 may also include input and output devices, network access devices, buses, etc.

The processor 43 can be a central processing unit (CPU), or can be another general-purpose processor, a digital signal processor (DSP) an application specific integrated circuit (ASIC), a Field-Programmable Gate Array (FPGA) or other programmable logic device, discrete gate or transistor logic device, discrete hardware components, etc. The general purpose processor can be a microprocessor or the processor may be any conventional processor or the like, and the processor 43 is an operation core and a control center of the electronic device 4, and connects the entire electronic device by using various interfaces and lines, and running an operating system of the electronic device 4 and various installed applications, program codes, and the like.

In some embodiments provided by the present disclosure, it should be understood that a disclosed system, a device, and a method can be implemented in other manners. For example, device embodiments described above are illustrative. For example, a division of the modules is only a logical function division, and an actual implementation can be in another manner of division.

The modules described as separate components can or may not be physically separated, and components displayed as modules can or may not be physical units. That is, the modules and the components can be located in one place, or can be distributed to a plurality of network units. Some or all of the modules can be selected according to actual requirements to achieve purposes of solutions of the embodiments.

In addition, each functional module in each embodiment of the present disclosure can be integrated into one processing unit, or each unit can exist physically separately, or two or more units can be integrated into one unit. An integrated unit above can be implemented in the form of hardware or in a form of hardware with software function modules.

It is apparent to those skilled in a technical field that the present disclosure is not limited to details of the above described exemplary embodiments. The present disclosure can be embodied in other specific forms without departing from spirits or essential characteristics of the present disclosure.

From any point of view, present embodiments are considered as illustrative and not restrictive, and scope of the present disclosure is limited only by appended claims instead. All changes in meanings and scopes of equivalent elements are included in the present disclosure. Any accompanying drawings in the claims should not be construed as limiting the claims.

In addition, it is to be understood that the word 'comprising' does not exclude other elements or steps, singular or plural. A plurality of units or devices recited in system claims can also be implemented by a unit or a device by software or hardware. The word 'second' is used to denote a name and does not denote any particular order.

It should be noted that the above embodiments are only for explaining the technical solutions of the present disclosure, and the above embodiments are not intended to be limiting. Although the present disclosure has been described in detail with reference to preferred embodiments, average technician in the field should understand that modifications or equivalent substitutions are departing from the spirits and the scopes of the technical solution of the present disclosure.

We claim:

1. A fracture detection method, the method comprising:
   obtaining a to-be-detected image;
   using a Fully Convolutional Networks (FCN) model to process the to-be-detected image to obtain a fracture probability map of the to-be-detected image;
   performing a maximum pooling process on the fracture probability map to obtain a first fracture probability;
   extracting Regions of Interests (ROIs) of the to-be-detected image based on the FCN model;
   inputting the ROIs into a classification model to obtain a second fracture probability;
   calculating a product of the first fracture probability and the second fracture probability as a probability of a fracture phenomenon in the to-be-detected image.

2. The fracture detection method according to claim 1, further comprising:
   obtaining sample images with labels, the label being used for determining a true fracture probability of each of the sample images;
   using an FCN algorithm to process the sample images to obtain a probability map of each of the sample images;
   performing a Log of a Sum of Exponentials (LSE) pooling process on the probability map to obtain a third fracture probability of each of the sample images;
   determining the true fracture probability of the sample images according to the labels of the sample images;
   using a Binary Cross Entropy (BCE) algorithm to process the third fracture probability and the true fracture probability to obtain a first loss value;
   optimizing parameters of the FCN according to the first loss value.

3. The fracture detection method according to claim 2, further comprising:
   determining fracture samples and non-fracture samples according to the labels of the sample images;
   extracting ROIs of the fracture samples as positive samples and extracting ROIs of the non-fracture samples as negative samples based on the probability map;
   using a residual network to train a classification model based on the positive samples and the negative samples;

obtaining output data of the classification model;
processing the output data by using the BCE algorithm to obtain a second loss value;
optimizing parameters of the classification model using a back propagation algorithm according to the second loss value.

4. The fracture detection method according to claim 3, wherein the extracting the ROIs of the fracture samples as positive samples comprises:
  determining a probability map corresponding to each image of the fracture samples to be a first probability map;
  obtaining regions of each image according to the first probability map, wherein a fracture probability of each of the regions is greater than or equal to a preset threshold;
  extracting a first number of regions from the regions of each of the fracture samples as the ROIs;
  determining the positive samples based on the ROIs.

5. The fracture detection method according to claim 4, wherein the extracting of ROIs of the non-fracture samples as negative samples comprises:
  determining a probability map corresponding to each image of the non-fracture samples to be a second probability map;
  obtaining regions of each image according to the second probability map, wherein a fracture probability of each of the regions is greater than or equal to the preset threshold;
  determining a second number of the regions;
  comparing the second number and the first number to get a comparison result;
  determining ROIs of each image according to the comparison result;
  determining the negative sample based on the ROIs of each image.

6. The method according to claim 5, wherein the determining of ROIs of each image according to the comparison result comprises:
  extracting the first number regions randomly from the regions as the ROIs of each image when the second number is greater than or equal to the first number; or
  when the second number is smaller than the first number, recording the regions as first ROIs, extracting a third number regions randomly from each image as second ROIs, determining the first ROIs and the second ROIs as the ROIs of each image.

7. The fracture detection method according to claim 3, wherein the labels being further used to determine a fracture type of the sample images, the method further comprising:
  determining a fracture type of the positive sample based on the labels;
  adding a fracture classification node to the classification model based on the positive sample and the fracture type of the positive sample;
  calculating a training loss of the classification model after adding the node;
  optimizing the classification model after adding the node based on the training loss.

8. An electronic device, the electronic device comprising:
at least one processor; and
a storage device storing a plurality of instructions, which when executed by the processor, causes the at least one processor to:
  obtain a to-be-detected image;
  use a Fully Convolutional Networks (FCN) model to process the to-be-detected image to obtain a fracture probability map of the to-be-detected image;
  perform a maximum pooling process on the fracture probability map to obtain a first fracture probability;
  extract Regions of Interests (ROIs) of the to-be-detected image based on the FCN model;
  input the ROIs into a classification model to obtain a second fracture probability;
  calculate a product of the first fracture probability and the second fracture probability as a probability of a fracture phenomenon in the to-be-detected image.

9. The electronic device according to claim 8, wherein the at least one processor being further caused to:
  obtain sample images with labels, the label being used for determining a true fracture probability of each of the sample images;
  use an FCN algorithm to process the sample images to obtain a probability map of each of the sample images;
  perform a Log of a Sum of Exponentials (LSE) pooling process on the probability map to obtain a third fracture probability of each of the sample images;
  determine the true fracture probability of the sample images according to the labels of the sample images;
  use a Binary Cross Entropy (BCE) algorithm to process the third fracture probability and the true fracture probability to obtain a first loss value;
  optimize parameters of the FCN according to the first loss value.

10. The electronic device according to claim 9, wherein the at least one processor being further caused to:
  determine fracture samples and non-fracture samples according to the labels of the sample images;
  extract ROIs of the fracture samples as positive samples and extracting ROIs of the non-fracture samples as negative samples based on the probability map;
  use a residual network to train a classification model based on the positive samples and the negative samples;
  obtain output data of the classification model;
  process the output data by using the BCE algorithm to obtain a second loss value;
  optimize parameters of the classification model using a back propagation algorithm according to the second loss value.

11. The electronic device according to claim 10, wherein the at least one processor being further caused to:
  determine a probability map corresponding to each image of the fracture samples to be a first probability map;
  obtain regions of each image according to the first probability map, wherein a fracture probability of each of the regions is greater than or equal to a preset threshold;
  extract a first number of regions from the regions of each of the fracture samples as the ROIs;
  determine the positive samples based on the ROIs.

12. The electronic device according to claim 11, wherein the at least one processor being further caused to:
  determine a probability map corresponding to each image of the non-fracture samples to be a second probability map;
  obtain regions of each image according to the second probability map, wherein a fracture probability of each of the regions is greater than or equal to the preset threshold;
  determine a second number of the regions;
  compare the second number and the first number to get a comparison result;

determine ROIs of each image according to the comparison result;
determine the negative sample based on the ROIs of each image.

13. The electronic device according to claim 12, wherein the at least one processor being further caused to:
extract the first number regions randomly from the regions as the ROIs of each image when the second number is greater than or equal to the first number; or
when the second number is smaller than the first number, record the regions as first ROIs, extract a third number regions randomly from each image as second ROIs, determine the first ROIs and the second ROIs as the ROIs of each image.

14. The electronic device f according to claim 10, wherein the at least one processor being further caused to:
determine a fracture type of the positive sample based on the labels;
add a fracture classification node to the classification model based on the positive sample and the fracture type of the positive sample;
calculate a training loss of the classification model after adding the node;
optimize the classification model after adding the node based on the training loss.

15. A non-transitory storage medium having stored thereon instructions that, when executed by a processor of an electronic device, causes the processor of the electronic device to perform a fracture detection method, the method comprising:
obtaining a to-be-detected image;
using a Fully Convolutional Networks (FCN) model to process the to-be-detected image to obtain a fracture probability map of the to-be-detected image;
performing a maximum pooling process on the fracture probability map to obtain a first fracture probability;
extracting Regions of Interests (ROIs) of the to-be-detected image based on the FCN model;
inputting the ROIs into a classification model to obtain a second fracture probability;
calculating a product of the first fracture probability and the second fracture probability as a probability of a fracture phenomenon in the to-be-detected image.

16. The non-transitory storage medium according to claim 15, the method further comprising:
obtaining sample images with labels, the label being used for determining a true fracture probability of each of the sample images;
using an FCN algorithm to process the sample images to obtain a probability map of each of the sample images;
performing a Log of a Sum of Exponentials (LSE) pooling process on the probability map to obtain a third fracture probability of each of the sample images;
determining the true fracture probability of the sample images according to the labels of the sample images;
using a Binary Cross Entropy (BCE) algorithm to process the third fracture probability and the true fracture probability to obtain a first loss value;
optimizing parameters of the FCN according to the first loss value.

17. The non-transitory storage medium according to claim 16, the method further comprising:
determining fracture samples and non-fracture samples according to the labels of the sample images;
extracting ROIs of the fracture samples as positive samples and extracting ROIs of the non-fracture samples as negative samples based on the probability map;
using a residual network to train a classification model based on the positive samples and the negative samples;
obtaining output data of the classification model;
processing the output data by using the BCE algorithm to obtain a second loss value;
optimizing parameters of the classification model using a back propagation algorithm according to the second loss value.

18. The non-transitory storage medium according to claim 17, wherein extracting ROIs of the fracture samples as a positive sample comprises:
determining a probability map corresponding to each image of the fracture samples to be a first probability map;
obtaining regions of each image according to the first probability map, wherein a fracture probability of each of the regions is greater than or equal to a preset threshold:
extracting a first number of regions from the regions of each of the fracture samples as the ROIs;
determining the positive samples based on the ROIs.

19. The non-transitory storage medium according to claim 18, wherein extracting ROIs of the non-fracture samples as a negative sample comprises:
determining a probability map corresponding to each image of the non-fracture samples to be a second probability map;
obtaining, regions of each image according to the second probability map, wherein a fracture probability of each of the regions is greater than or equal to the preset threshold;
determining a second number of the regions;
comparing the second number and the first number to get a comparison result;
determining ROIs of each image according to the comparison result;
determining the negative sample based on the ROIs of each image.

20. The non-transitory storage medium according to claim 19, wherein determining ROIs of each image according to the comparison result comprises:
extracting the first number regions randomly from the regions as the ROIs of each image when the second number is greater than or equal to the first number; or
when the second number is smaller than the first number, recording the regions as first ROIs, extracting a third number regions randomly from each image as second ROIs, determining the first ROIs and the second ROIs as the ROIs of each image.

* * * * *